Patented Feb. 20, 1934

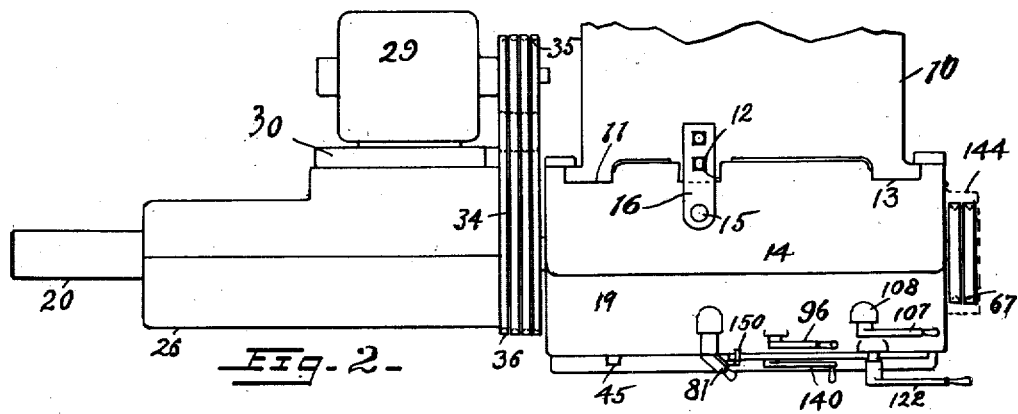
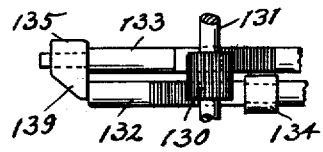
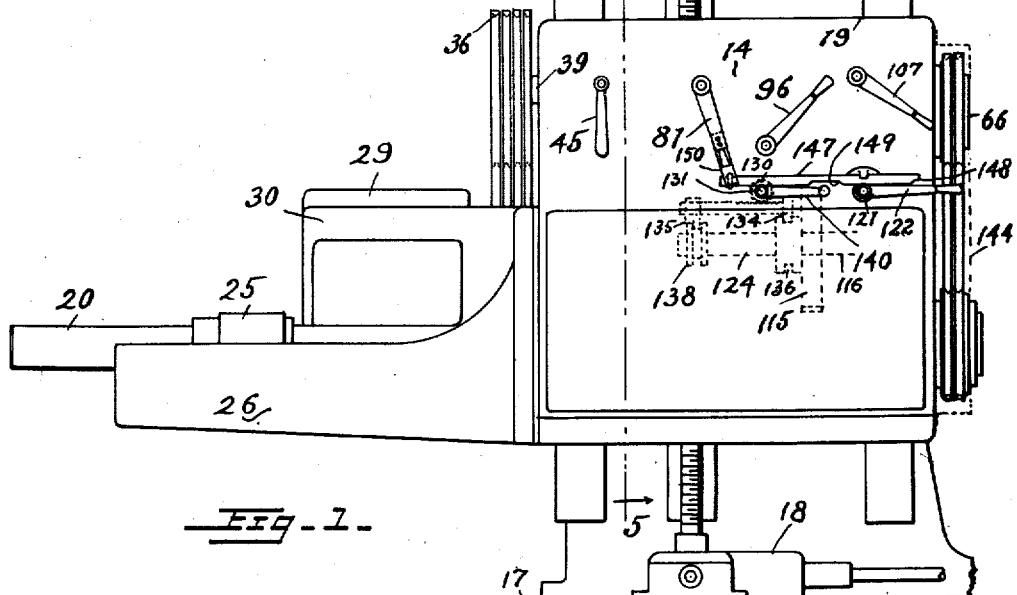

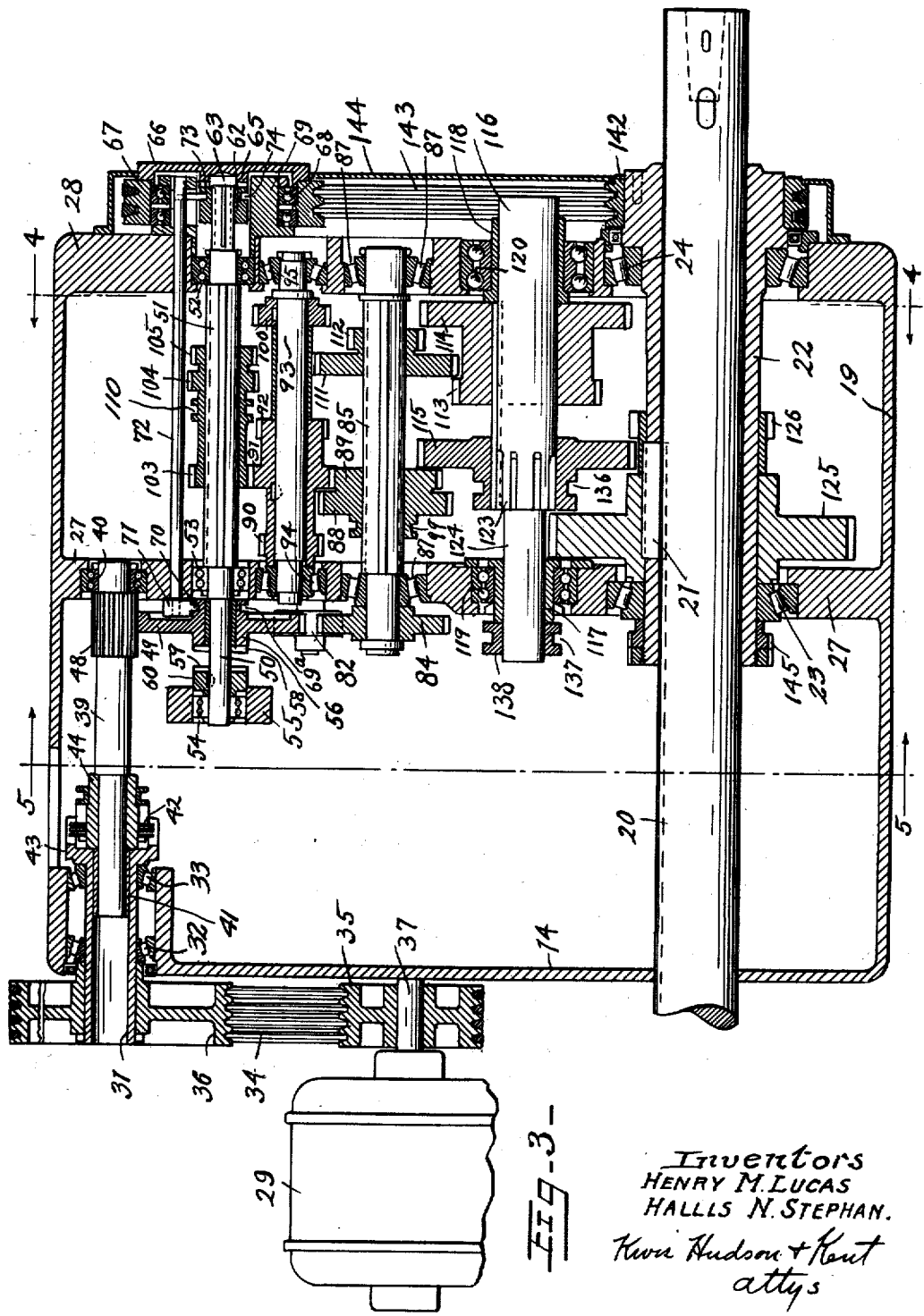
Fig-3-

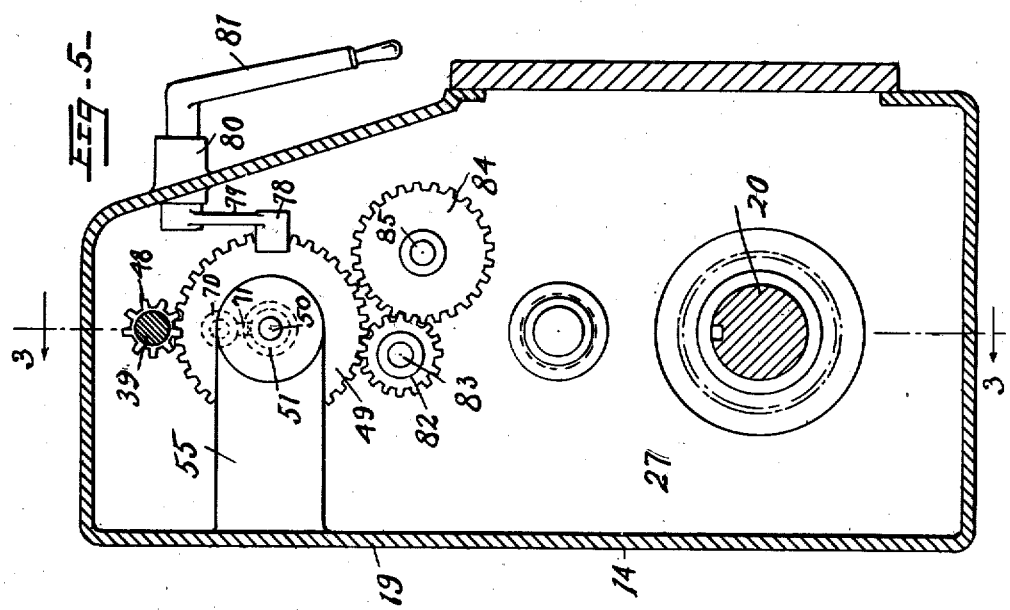
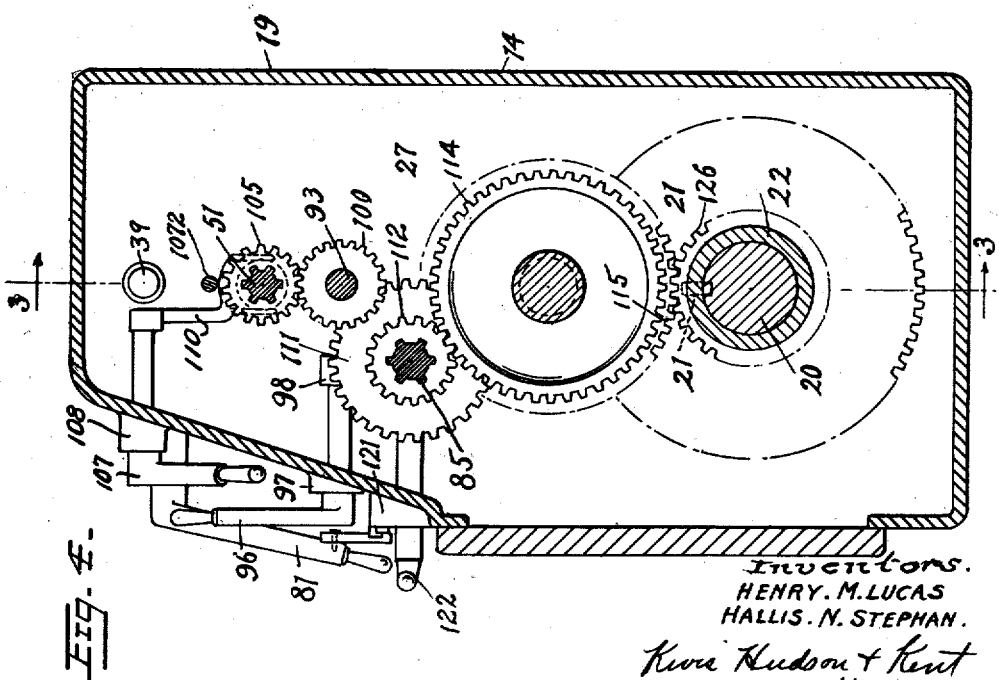

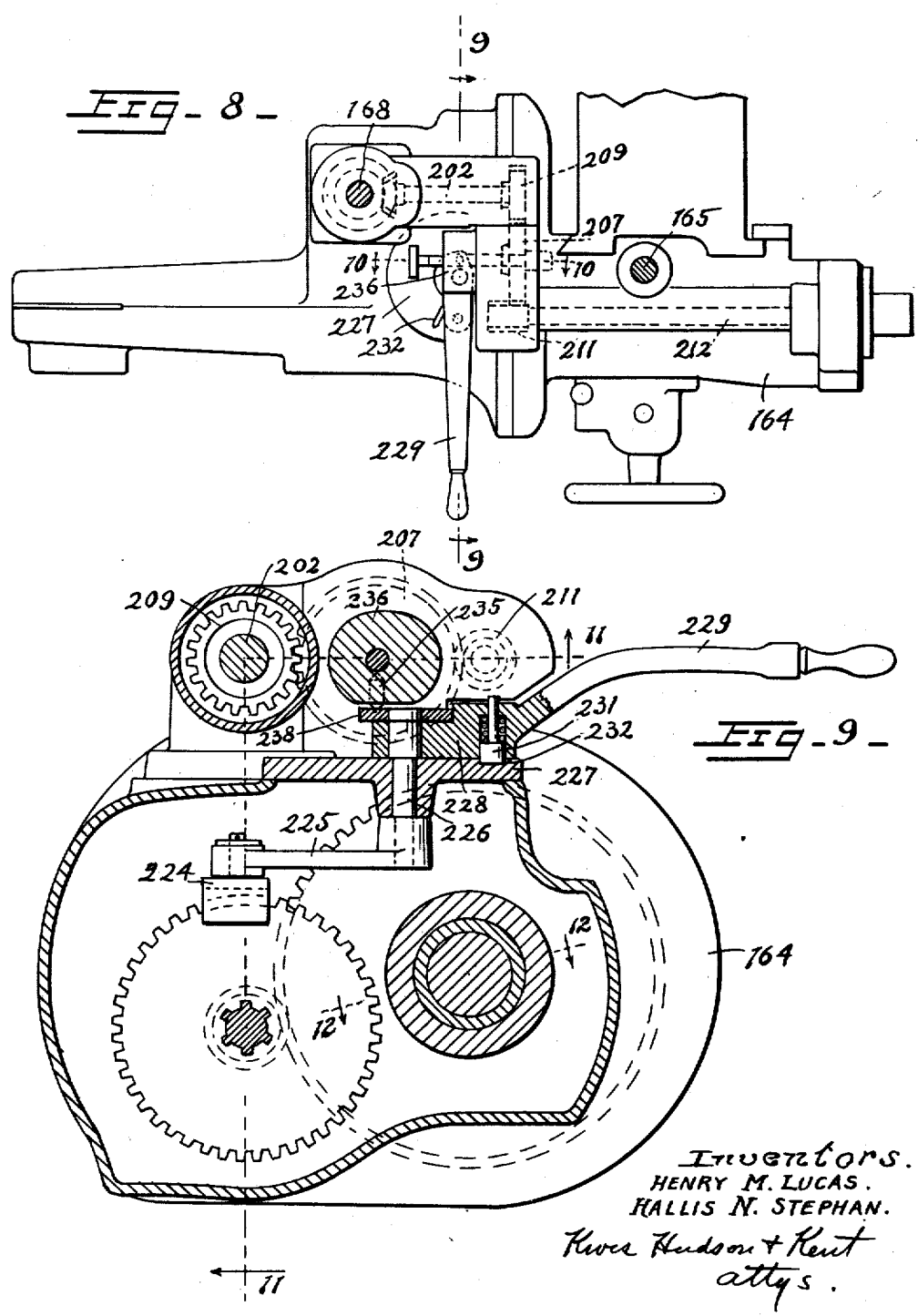

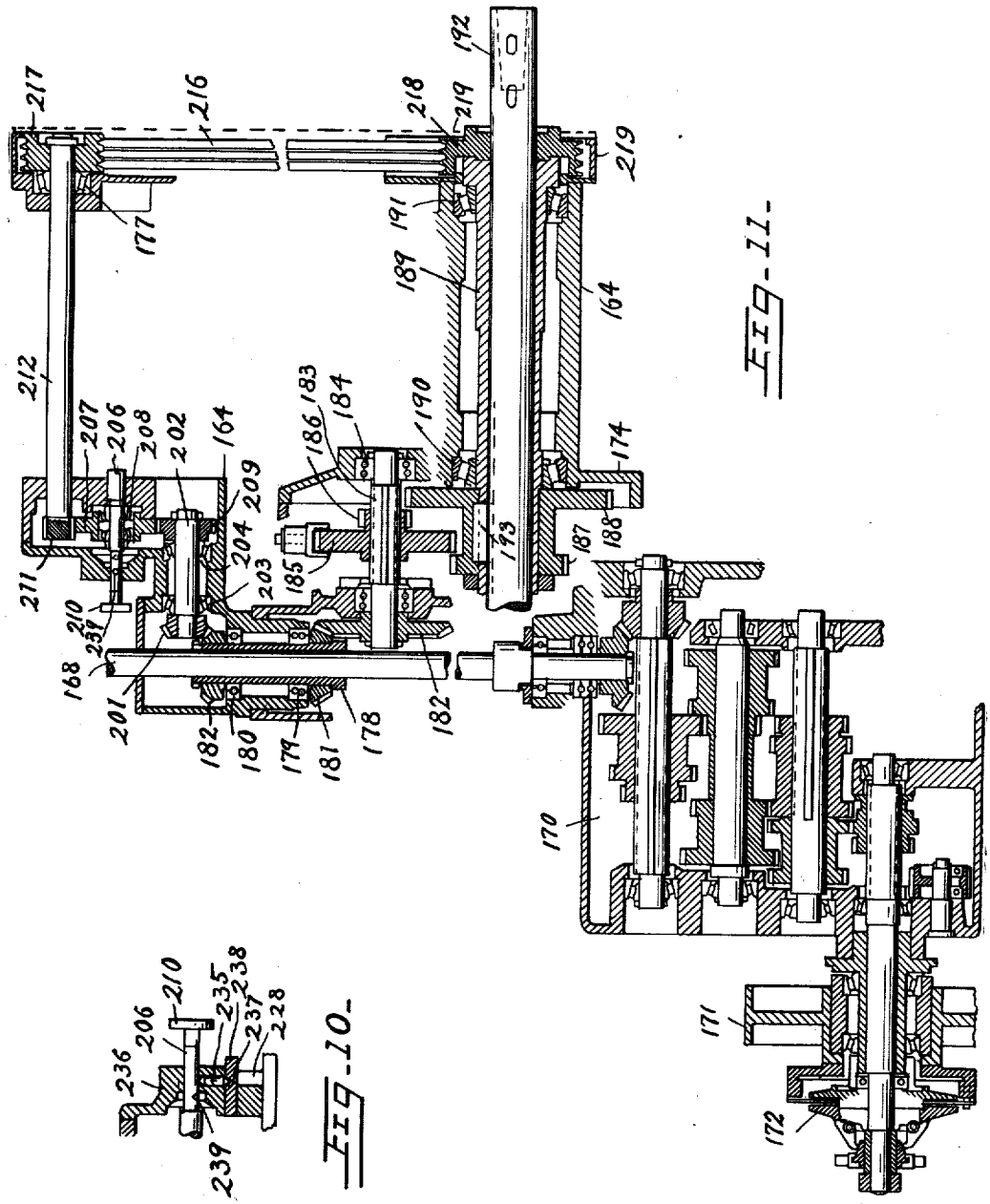

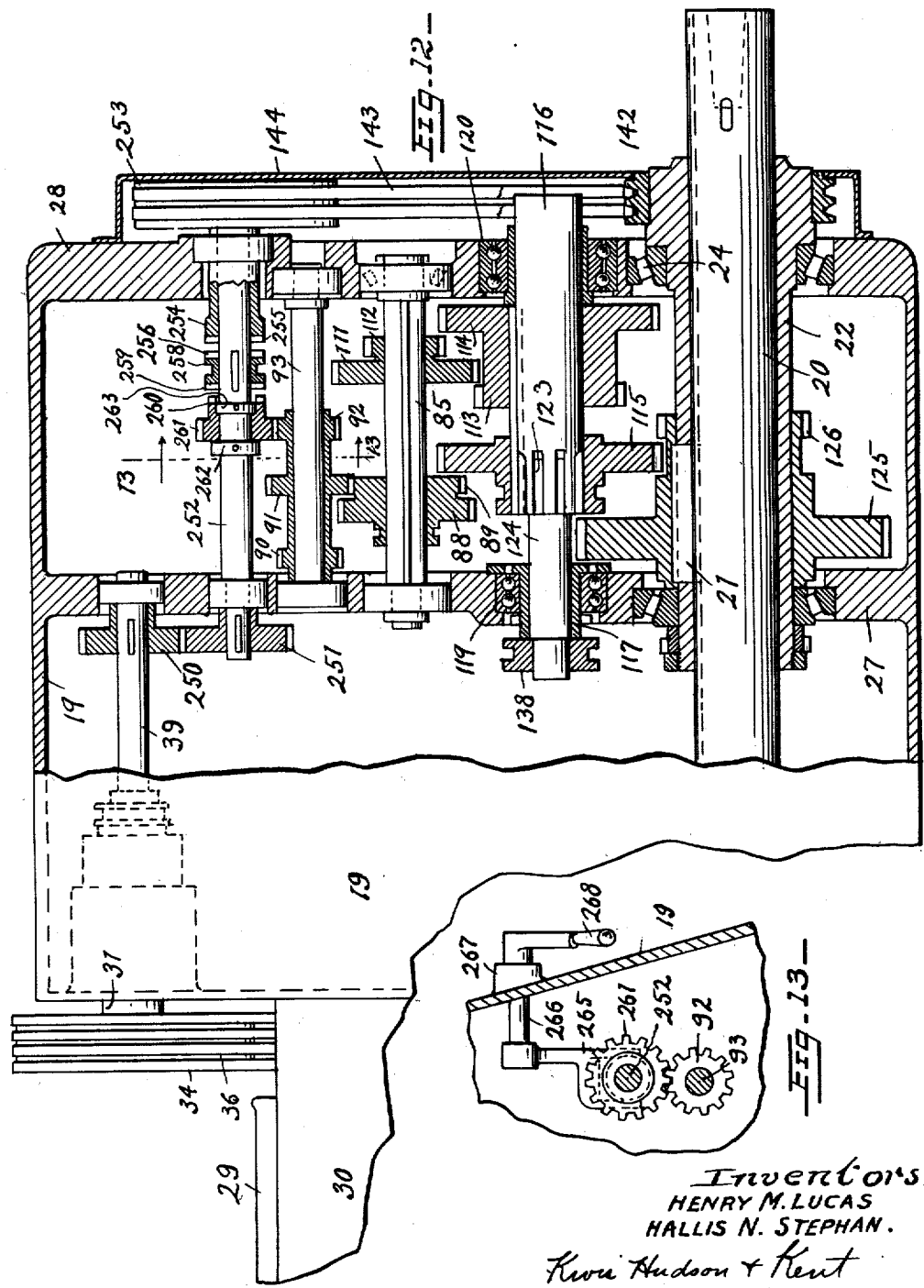

1,947,862

UNITED STATES PATENT OFFICE 1,947,862

SPECIAL HIGH SPEED DRIVE FOR THE SPINDLE OF BORING MACHINES OR OTHER MACHINE TOOLS

Henry M. Lucas, Cleveland Heights, and Hallis N. Stephan, Cleveland, Ohio, assignors to The Lucas Machine Tool Company, Cleveland, Ohio, a corporation of Ohio Application January 9, 1932. Serial No. 585,666

28 Claims. (Cl. 29—26)

The present invention relates to metal working machines and more particularly to a spindle drive for a horizontal boring machine.

The advent of high speed cutting alloys in the machine tool art necessitates a wider range of and higher spindle speeds in drilling and boring machines to obtain maximum efficiency for different sized tools and diameters of work being machined. With the conventional change gear drives now in use, the requirement of high spindle speeds makes necessary excessive peripheral speeds of the gears and especially the driving gears of the train adjacent the spindle end of the drive. These high peripheral speeds of the gears are impracticable and cause excessive noise, especially when the amount of power transmitted is considerable, as is the case in machine tools of the type referred to.

An object of the present invention is the provision of a novel spindle drive for machine tool spindles which will be capable of a wide range of spindle speeds and have a minimum of noise at all speeds and under all load conditions.

Another object of the invention is the provision of a novel spindle drive for machine tools which will include a flexible driving connection between a drive shaft and the spindle.

Another object of the invention is the provision of a novel spindle drive for a drilling or boring machine which consists of two means for driving said spindle from a common shaft, one of which means includes a flexible driving connection between two of the elements thereof.

Another object of the present invention is the provision of a novel spindle drive for a drilling or boring machine which includes a change speed gear drive for the lower spindle speeds, a flexible drive connection for the higher spindle speeds, and means for preventing simultaneous operation of both drives.

Further objects and advantages of the invention will be apparent to those skilled in the art from the following description of the preferred embodiment of the invention described with reference to the accompanying drawings, in which:

Figure 1 is a front elevational view of the head column and head of a horizontal boring machine embodying one form of the present invention.

Fig. 2 is a plan view of the part of the machine shown in Fig. 1, with the rear part of the column broken away.

Fig. 3 is a sectional view with portions in elevation taken through the spindle head on the lines 3—3 of Figs. 4 and 5.

Fig. 4 is a sectional view taken through the spindle head on the line 4—4 of Fig. 3.

Fig. 5 is a sectional view taken through the spindle head on the lines 5—5 of Figs 1 and 3.

Fig. 6 is a detailed view of the interlock and gear shift mechanism shown in Fig. 1.

Fig. 8 is a sectional view with the rear part of the column broken away, taken on the line 8—8 of Fig. 7.

Fig. 9 is a sectional view of the spindle head shown in Figs. 6 and 7, taken on the line 9—9 of Fig. 8.

Fig. 10 is a sectional view with portions shown in elevation, on the line 10—10 of Fig. 8.

Fig. 11 is a developed sectional view of the gear drive taken on a plane through the vertical drive shaft parallel with the front of the machine and the line 11—11 of Fig. 9, with the lower right-hand portion in section on the line 12—12.

Fig. 12 is a sectional view similar to Fig. 3 but showing a further modified form of construction, and Fig. 13 is a fragmentary sectional view substantially along the line 13—13 of Fig. 12.

Similar reference characters indicate corresponding parts throughout the several figures of the drawings.

Figure 7:
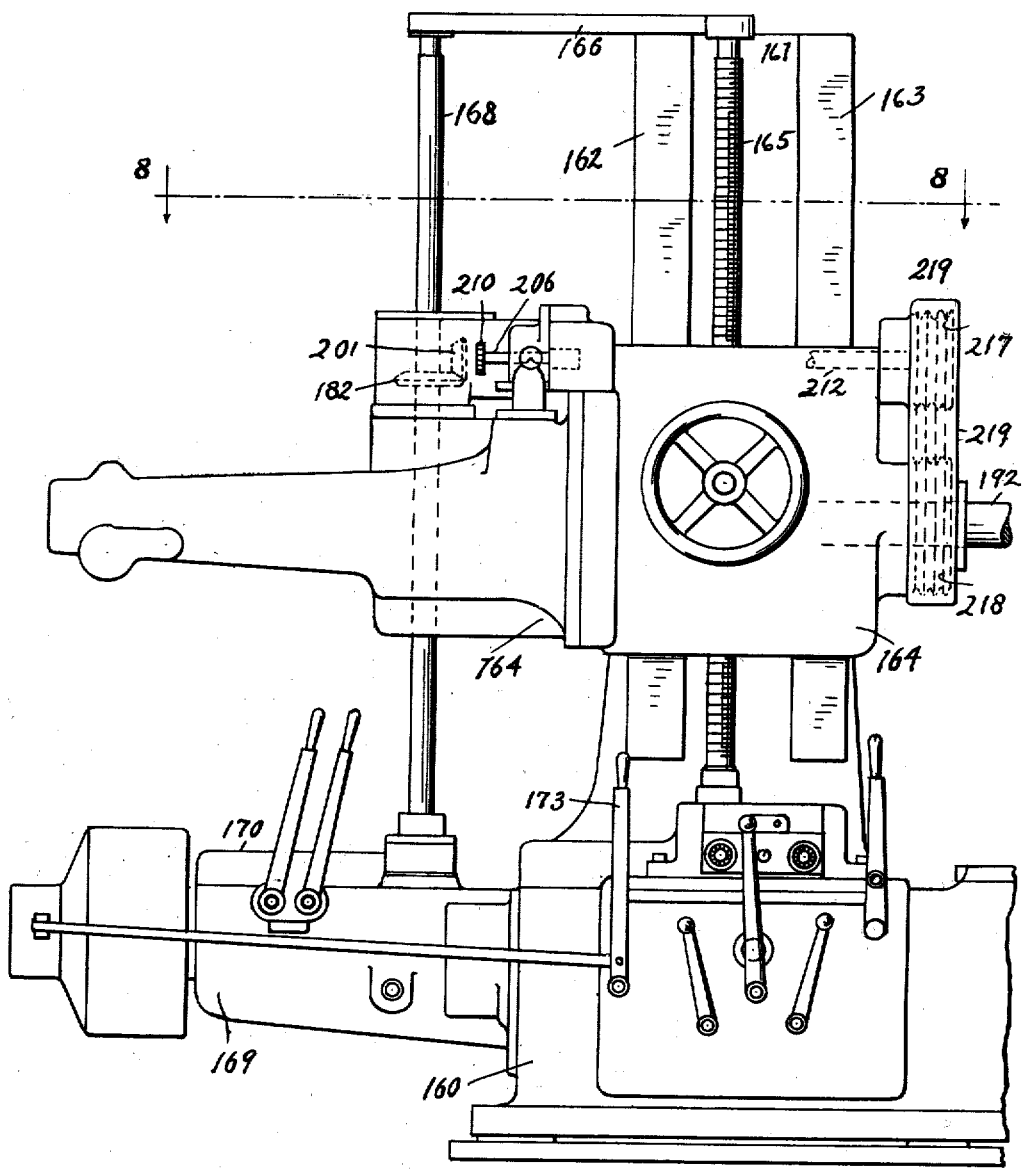
Fig. 7 is a front elevational view of the head end of a horizontal boring machine showing a modified form of the present invention.

Referring to the drawings, the reference character 10 designates the vertical head column of a horizontal boring machine, of which only the head column and spindle head are shown. The remaining parts of the machine, that is the base and work holding means, etc., do not form a part of the present invention, and may be found in a plurality of different embodiments well known in the art. The vertical head column 10 is provided on its front face with a plurality of guide surfaces 11, 12 and 13 upon which the head 14 is slidably supported and is moved vertically therealong by means of a screw shaft 15 rotatably supported by a bracket 16 attached to the top of the column 10 and by a suitable bearing, not shown, in the base 17 of the machine. The screw shaft 15 is driven from the main drive of the machine in a manner well known in the art through mechanism indicated in general by the reference character 18.

A tool spindle 20 is slidably keyed, as by a key 21, in a spindle quill 22 rotatably supported in the spindle head 14 by anti-friction bearings 23 and 24 secured in the frame 19 of the spindle head 14. The lefthand end of the spindle 20 is rotatably supported in a suitable bearing 25 carried on a horn 26 projecting from the spindle head 14. The spindle head 14 has a partition near the center thereof formed integral with the frame 19 which, together with the righthand end 28 of the frame 19 supports a plurality of shafts carrying the change gears and/or flexible drives, through which the spindle 20 is driven from an electric motor 29 mounted on a bracket 30 attached to the rear of the frame 19 of the spindle head 14.

A short tubular shaft 31 rotatably supported in the spindle head 14 by anti-friction bearings 32 and 33 is driven from the motor 29 by a flexible multi-V-belt drive indicated in general by the reference character 34. While the flexible drive illustrated consists of four V-belts looped about suitable pulleys 35 and 36 mounted on the motor shaft 37 and the shaft 31 respectively, it is to be understood that any drive, flexible or otherwise, or a direct-connected motor may be used instead. The tubular shaft 31 is operatively connected to a shaft 39, rotatably supported by anti-friction bearings 40 in the partition 27 and a bearing member 41 in the interior of the shaft 31, by means of a friction clutch 42, alternate plates of which are keyed to an enlarged portion 43 of the tubular shaft 32 and a sleeve member 44 fixed on the shaft 39. The clutch 42 is controlled from a hand lever 45 rotatably supported in the frame 19 in a well known manner.

An elongated pinion 48 formed integral with the shaft 39 near the right-hand end thereof is continuously in mesh with a gear 49 rotatably mounted on a reduced end 50 of a splined shaft 51. The splined shaft 51 is rotatably supported in the end frame 28, the partition 27, and a projection 55 formed integral with the frame 19, by anti-friction bearings 52, 53 and 54. A clutch element 58 formed on one end of the hub 56 of the gear 49 is adapted to engage and disengage a cooperating clutch element 59 formed on a member 60 keyed to the shaft 51 as the gear 49 is shifted to the left or right, as viewed in Fig. 3, by mechanism hereinafter described.

The righthand end of shaft 51 is also reduced and carries a clutch member 62 splined thereon which forms one element of a clutch, designated in general by the reference character 63, the other element of which is formed on a flange 65 of a disk-shaped member 66. The clutch 63 is engaged and disengaged as the member 72 is shifted toward the right and left, respectively as viewed in Fig. 3. The disk-shaped member 66 is secured to a pulley wheel 67 rotatably supported, on a sleeve member 69 secured in the end frame 28, by anti-friction bearings 68. The gear wheel 49 has an annular groove 69a formed in the hub thereof into which extends a projection 70 formed on a collar 71 secured to one end of a rod 72. The rod 72 is slidably supported in the partition 27 and the end frame 28, and carries at the righthand end thereof as viewed in Fig. 3, a pin 73 projecting in an annular groove 74 formed in the member 62.

The gear 49 is shifted longitudinally on the shaft 51 to engage and disengage clutches 58, 59, and 63 by a yoke member 78, see Fig. 5, which engages over the gear. The yoke member 78 is attached to one end of a lever 79, the other end of which is attached to a short shaft 80 rotatably mounted in the frame 19 of the head 14. The shaft 80 extends to the exterior of the frame 19 where a handle 81 is attached thereto. The gear 49, when in the position illustrated in Fig. 3, is in mesh with an idler gear 82 rotatably supported on a short shaft 83 fixed to the partition 27. The idler gear 82 is continuously in mesh with a gear 84 keyed to one end of a splined shaft 85 rotatably supported in the partition 27 and the end frame 28 by anti-friction bearings 86 and 87. The splined shaft 85 carries two integrally formed gears 88 and 89 slidable into and out of mesh with integrally formed gears 90 and 91, respectively, which, together with a gear 92 formed integrally therewith, are keyed on a shaft 93 rotatably supported in the partition 27 and the end frame 28 by anti-friction bearings 94 and 95. Gears 88, 89 are shifted to either of their engaged positions or to a neutral position by a hand lever 96 rotatably supported in a boss 97 formed on the frame 19, and operatively connected thereto by a yoke member 98 which engages in a groove 99 formed in the hub of the gears, in a manner well known in the art. Three integrally formed gears 103, 104, and 105 slidably supported on the splined shaft 51 are adapted to be shifted axially into or out of mesh with gears 91, 92, and a gear 100 keyed on the shaft 93, respectively. The gears 103, 104, and 105 are shifted to either of their engaged positions or to a neutral position by a hand lever 107 rotatably supported in a boss 108 formed on the frame 19, and operatively connected thereto by a yoke member 109 which engages in a groove 110 formed in the hub of the gears.

A second pair of integrally formed gears 111 and 112, slidably mounted on the splined shaft 85, are adapted to be shifted axially into and out of mesh with integrally formed gears 113 and 114, respectively. The gears 113 and 114, and a gear 115 are slidably keyed on a shaft 116 which in turn is slidably supported in sleeve members 117 and 118 rotatably supported in the partition 27 and end frame 28 by anti-friction bearings 119 and 120. The gears 111 and 112 are moved axially along the splined shaft 85 into their neutral or engaged positions by a hand lever 122 rotatably supported in a boss 121 formed on the frame 19 and is operatively connected thereto in any suitable manner as by a yoke member engaging in a groove formed in the hub of the gears. The shaft 116 is reduced in diameter at one end and has a pinion 123 formed thereon adjacent the reduced portion 124, and is shifted longitudinally of its axis to engage and disengage the pinion 123 with a gear 125 keyed to the spindle quill 22 by the key 21. Suitable means is provided for holding the gears 113 and 114 against axial movement at all times. The gear 115 is adapted to mesh with a small gear 126 keyed to the spindle quill 22. The shaft 116 and gear 115 are moved axially to engage and disengage the pinion 123 and the gear 115, with gears 125 and 126, respectively, by the following mechanism. An elongated pinion 130 keyed to a short shaft 131 rotatably supported in the frame 19 is adapted to engage two racks formed on rods 132 and 133. The rods 132 and 133 are slidably supported in the frame 19 and carry yoke members 134 and 135 respectively. The yoke member 134 engages in a groove 136 formed in the hub of gear 115, and the member 135 engages in a groove 137 formed in a collar member 138 keyed to the reduced portion 124 of shaft 116. The racks are interrupted at opposite ends, see Fig. 6, and the member 135 is provided with a projection 139 which projects in the path of movement of the rod 132. The shaft 131 is rotated by means of a hand lever 140 keyed to one end thereof outside the frame 19. The construction is such that for a certain position of the hand lever 140 both gears are in their neutral position, and rotation of the lever 140 in a clockwise direction as viewed in Fig. 1 will move shaft 116 and engage pinion 123 with gear 125. Rotation of the hand lever 140 in a counter-clockwise direction will move pinion 123 to its neutral position and then shift gear 115 to engage gear 126 etc.

A pulley wheel 142 similar to pulley wheel 67 is keyed on the spindle quill 22 exteriorly of the end frame 28, and is operatively connected to and driven from the pulley wheel 67 by a flexible multi-V-belt drive indicated in general by the reference character 143. While the flexible drive illustrated consists of two V-belts looped about the pulleys 67 and 142, and encircling the spindle 20, it is to be understood that any flexible drive such as a silent chain drive, etc., may be used instead, the V-belts illustrated being merely the preferred embodiment. A guard member 144 illustrated in dotted lines in Figs. 1 and 2 and adapted to enclose the flexible drive, is bolted or otherwise secured to the righthand end of the frame 19 of the spindle head 14. A feed gear 145 is carried on one end of the spindle quill 22.

In order to prevent simultaneous operation of both the gear drive and the flexible drive the following interlock is provided. The hub sections of both hand levers 122 and 140 are provided with a flat surface engaged by the underside of a bar 147 slidably supported in suitable guides formed on the boss 121 and the boss which supports the shaft 131. When the flat surfaces on the hubs of the levers 122 and 140 are engaged by the lower surface of the bar 147 the levers are locked in their neutral position and cannot be rotated or moved from this position until the bar 147 is shifted so that cut-away portions 148 and 149 thereof are adjacent the hubs of the levers. The bar 147 is operatively connected to the hand lever 81 by a member 150 carried by said lever. The construction is such that the hand levers 122 and/or 140 cannot be moved out of their neutral position to engage the gear drive unless the flexible drive is disengaged; and the flexible drive cannot be engaged unless the hand levers 122 and 140 are in their neutral positions with the gear drive disengaged.

From the above description, it will be apparent that the spindle 20 may be driven from the motor 29 at a plurality of cutting or working speeds from the pinion 48 through gear 49, clutch elements 58, 59, shaft 51, gears 103, 104 or 105, gears 91, 92 or 100, gears 90, or 91, gears 88 or 89, shaft 85, gears 111 or 112, gears 113 or 114, shaft 116, gears 115 or 123, and gears 125 or 126. The spindle 20 may also be driven at a plurality of speeds from pinion 48 through gear 49, idler gear 82, gear 84, shaft 85, gears 88 or 89, gears 90 or 91, gears 91, 92 or 100, gears 103, 104, or 105, shaft 51, clutch 63, disk 66, pulley 67, flexible drive 143, and pulley 142. The ratio of the change gears is such that the low spindle speeds are obtained through the gear drive and the higher spindle speeds obtained through the flexible drive.

A modified form of the invention is shown in Figs. 7 to 11 inclusive. In Fig. 7 the head end of a horizontal boring machine is illustrated, the base of which is indicated by the reference character 160. A vertical column 161 supported on the base 160 is provided with guide surfaces 162 and 163 upon which the spindle head 164 is slidably supported. The spindle head 164 is moved vertically along the column 161 by means of screw shaft 165 rotatably supported in a bracket 166 fixed to the top of the column and a suitable bearing, not shown, in the base of the machine. The screw shaft 165 is driven from the main drive of the machine in a manner well known in the art. Power is supplied to the spindle head 164 by means of a splined shaft 168 rotatably supported at the upper end of the bracket 166 and at the lower end in a suitable bearing, not shown, in a horn 169 projecting to the right, as viewed in Fig. 7, from the base 160 of the machine. The splined shaft 168 is driven through change gears indicated in general by the reference character 170 mounted in the base of the machine by a prime mover illustrated as a pulley wheel 171. In the present embodiment of the invention, a friction clutch 172 operated by a lever 173 is adapted to connect and disconnect the pulley wheel 171 with the change gears 170. The change gears 170 are enclosed within the horn 169 and are well known in this type of machine and will not be described in detail.

A sleeve 178 splined to the shaft 168 and rotatably supported inside the spindle head 164 by means of anti-friction bearings 179 and 180 carries two bevel gears 181 and 182 keyed thereto. The bevel gear 181 is continuously in mesh with a bevel gear 182' keyed to a short shaft 183 rotatably supported in the spindle head 174 by anti-friction bearings 184. Two integrally formed gears 185 and 186 are splined on shaft 183 and are shifted axially to engage and disengage two integral gears 187 and 188 respectively, keyed to a spindle quill 189 rotatably mounted in the spindle head 164 by anti-friction bearings 190 and 191. A spindle 192 is slidably keyed within the spindle quill 189 by a key 193 extending through a slot in said quill.

Bevel gear 182 is continuously in mesh with a bevel gear 201 keyed to a short shaft 202 rotatably supported in the spindle head 164 by anti-friction bearings 203 and 204, directly above the shaft 183. A rod or shaft 206 slidably supported in the spindle head 164 carries a gear 207 rotatably supported thereon by means of anti-friction bearings 208, and is adapted to be moved into or out of mesh with a gear 209 keyed on the shaft 202 upon axial movement of the shaft 206. The shaft 206 projects through the spindle head housing and is provided with a knurled knob 210 for manual operation of the same. An elongated pinion 211 keyed to one end of a shaft 212 is continuously in mesh with gear 207 in either its meshed or demeshed position with gear 209. The shaft 212 is rotatably supported in the spindle head 164, as by anti-friction bearings 177 and operatively connected to the spindle quill 189 by means of a flexible drive indicated in general by the reference character 216. The flexible drive illustrated consists of a plurality of V-belts looped about suitable pulleys 217 and 218 keyed to the shaft 212 and the spindle quill 189 respectively, and encircling the spindle 192, but the employment of any suitable flexible drive, such as a silent chain drive, is within the contemplation of this invention. A guard member 219 adapted to enclose the flexible drive is bolted or otherwise secured to the spindle head 164.

The gears 185 and 186 are shifted into and out of mesh with gears 187 and 188 respectively by means of a yoke-shaped member 224 carried on the end of the lever 225 attached to a short shaft 226 is rotatably supported in a plate 227 forming a part of the spindle head housing. A collar member 228 provided with a hand lever 229 is attached to the shaft 226 on the exterior of the spindle head housing for manual operation. A spring pressed plunger 231 positioned in a suitable aperture formed in the collar member 228 is adapted to engage in a plurality of openings 232 in the plate 227 and retain the lever 229 in either of its three operating positions, the center one of which is the neutral position.

To prevent the simultaneous engagement of the gears 185, 187, or 186, 188 and 207, 209 the following interlock is provided. A pin 235 provided with conical ends is slidably supported, in a suitable aperture formed in a boss 236 constituting part of the housing of the spindle head 164, directly beneath the shaft 206. The lower end of pin 235 drops into a small hole or depression 237 in a plate 238 fixed to the top of collar member 228 when the lever 229 is in its neutral position with gears 185 and 186 disengaged. The shaft 206 is provided with a small hole or depression 239 adapted to be aligned with the upper end of pin 235 when the gear 207 is in its disengaged position. The conical ends of the pin 235 cause the same to be cammed up or down as either the lever 229 or the shaft 206 is moved. The construction is such that neither the hand lever 224 nor the shaft 206 can be moved from the neutral position unless both members are in the neutral position which prevents simultaneous operation of both drives.

From the above description it will be apparent that the shaft 168 may be driven at a plurality of speeds through the change gears 170 and that the spindle 192 can be driven at a plurality of cutting or working speeds from the shaft 168 through bevel gears 181, 182', shaft 183, change gears 185 and 187 or 186 and 188, or through bevel gears 182, 201, shaft 202, gears 209, 207, 211 and the flexible drive 216.

A further modification of the invention, similar to that shown in Figs. 1 to 6 inclusive, is illustrated in Figs. 12 and 13 in which the corresponding parts are indicated by the same reference characters. The gear 48 on shaft 39 has been replaced by a gear 250 which is continuously in mesh with a gear 251 keyed on a shaft 252 which replaces shaft 51 in the preferred embodiment. The pulley wheel 67 is replaced by a pulley wheel 253 rotatably supported in the end frame 28 coaxially with the shaft 252 and provided with an elongated hub 254 having clutch teeth 255 formed on the end thereof.

The clutch teeth 255 engage with corresponding teeth 256 formed on a clutch element 258 slidably keyed to shaft 252. The clutch element 258 has clutch teeth 259 formed thereon adapted to engage corresponding teeth 260 formed on the hub of a gear 261 rotatably supported on the shaft 252 between a pair of collars 262 and 263 which prevent axial movement of the same. Gear 261 is continuously in mesh with gear 92 on shaft 93.

The clutch element 258 is shifted axially of the shaft 252 to engage and drive the gear 261 or the pulley 253 by a yoke member 265 carried by a shaft 266 rotatably supported in a boss 267 formed on the frame 19 of the spindle head. A hand lever 268 is attached to the shaft 266 for manual operation.

In the modification of the invention illustrated in Figs. 12 and 13 the bar 147 of the interlock illustrated in Figs. 1 to 6 inclusive is operatively connected to hand lever 268 which replaces hand lever 107, instead of to hand lever 81.

While the preferred form of the invention has been illustrated in Figs. 1 to 6 inclusive and modified constructions in Figs. 7 to 11 inclusive and Figs. 12 and 13, it is understood that any combination of change gears is contemplated within the present invention. The flexible drive 143 may be connected to any of the shafts illustrated in Fig. 3 etc., and/or the shaft 51 may be directly driven from the pinion 48 as illustrated in Figs. 12 and 13, when the flexible drive is employed, instead of through the step-up gears as illustrated in Figs. 1 to 6 inclusive. We do not wish to be limited to the particular construction shown, which may be modified within the scope of this invention as defined by the appended claims.

Having thus described our invention, we claim:

1. In a machine tool, the combination of a tool spindle, and a plurality of means for driving said tool spindle, one of said means including a flexible driving connection encircling said tool spindle.

2. In a machine tool, the combination of a tool spindle, a gear drive encircling said tool spindle, and a flexible drive for said spindle for driving the same.

3. In a machine tool, the combination of a drive shaft, a tool spindle, and a plurality of means for driving said tool spindle from said shaft, one of said means including a flexible drive connection encircling said tool spindle.

4. In a machine tool, the combination of a drive shaft, a tool spindle, a change gear drive for driving said tool spindle from said shaft, a second drive for driving said tool spindle from said shaft, said second drive including a flexible connection encircling said tool spindle.

5. In a machine tool, the combination of a drive shaft, a tool spindle, a plurality of gear trains for driving said tool spindle from said shaft, a driven member supported coaxially with said tool spindle and a flexible drive connection between one of said trains and said driven member.

6. In a machine tool, the combination of a tool spindle, a plurality of change gear trains for driving said tool spindle at different speeds, and a flexible drive connection encircling said tool spindle between the high speed train and said tool spindle.

7. In a machine tool, the combination of a drive shaft, a tool spindle, a gear train for driving said tool spindle from said shaft, a second drive for driving said tool spindle from said shaft including a part of said gear train, and a flexible connection to said tool spindle, said flexible drive connection encircling said tool spindle.

8. In a machine tool, the combination of a drive shaft, a tool spindle, a reduction gear train for driving said tool spindle from said shaft at low speeds, and a high speed drive for driving said tool spindle from said shaft utilizing part of said reduction gears and a flexible drive coupling to said tool spindle, said flexible drive connection encircling said tool spindle.

9. In a machine tool, the combination of a drive shaft, a tool spindle, an intermediate shaft, change gears supported on said shafts and said tool spindle for driving said tool spindle from said drive shaft, and a flexible drive connection encircling said tool spindle from one of said shafts to said tool spindle.

10. In a machine tool, the combination of a drive shaft, a tool spindle, a plurality of intermediate shafts, change gears supported on said intermediate shafts and adapted to drive said tool spindle from said drive shaft, and a flexible drive connection encircling said tool spindle between one of said intermediate shafts and said tool spindle.

11. In a machine tool, the combination of a frame, a drive shaft rotatably supported with reference to said frame, a spindle quill rotatably supported by said frame, a spindle slidably keyed in said spindle quill, and a plurality of means for operatively connecting said shaft and said quill, one of said means including a flexible drive connection.

12. In a machine tool, the combination of a frame, a drive shaft rotatably supported with reference to said frame, a spindle quill rotatably supported by said frame, a spindle slidably keyed in said spindle quill, change gears for operatively connecting said shaft and spindle, and a flexible drive connection for operatively connecting said shaft and spindle.

13. In a machine tool, the combination of a frame, a drive shaft rotatably supported with reference to said frame, a spindle quill rotatably supported by said frame, a spindle slidably keyed in said spindle quill, a gear drive for operatively connecting said shaft and spindle quill, a flexible drive for operatively connecting said shaft and spindle quill, and means for preventing simultaneous engagement of both drives.

14. In a spindle head for a boring machine, the combination of a tool spindle, a gear drive for said tool spindle, a flexible drive encircling said tool spindle for driving the same, and means for connecting and disconnecting said drives.

15. In a spindle head for a boring machine, the combination of a frame adapted to be slidably supported on a base, a drive shaft, a tool spindle rotatably supported by said frame, change gears for operatively connecting said shaft and tool spindle, a flexible drive connection for operatively connecting said shaft and tool spindle, and means for connecting and disconnecting said drives with said tool spindle.

16. In a spindle head for a boring machine, the combination of a frame, a driving shaft rotatably supported in said frame, a spindle quill rotatably supported in said frame, a spindle slidably keyed in said quill, change gears adapted to operatively connect said shaft and said quill, a flexible drive between said shaft and quill, and means for connecting and disconnecting said flexible drive.

17. In a machine tool the combination of a tool spindle, a gear drive adapted to rotate said tool spindle, a flexible drive encircling said tool spindle adapted to rotate the same, means for rendering either of said drives operative to rotate said tool spindle, and means for preventing the simultaneous operation of said drives.

18. A spindle head for a boring machine comprising a frame, a tool spindle rotatably supported by said frame, a gear drive encircling said tool spindle for rotating said tool spindle, a flexible drive adapted to rotate said tool spindle, means for causing either of said drives to rotate said tool spindle, and means for preventing the simultaneous operation of said drives.

19. A spindle head for a boring machine comprising a frame, a spindle quill rotatably supported by said frame, a spindle slidably supported by said spindle quill, a gear drive adapted to rotate said spindle quill, a flexible drive adapted to rotate said spindle quill, and means for operatively connecting and disconnecting either of said drives.

20. A spindle head for a boring machine comprising a frame, a spindle quill rotatably supported by said frame, a spindle slidably supported by said spindle quill, a gear drive adapted to rotate said spindle quill, a flexible drive adapted to rotate said spindle quill, means for operatively engaging and disengaging either of said drives, and means for preventing the simultaneous engagement of said drives.

21. A spindle head for a boring machine comprising a frame, a drive shaft rotatably supported by said frame, a tool spindle rotatably supported by said frame, and a plurality of means for driving said tool spindle from said shaft, one of said means including a flexible drive connection encircling said tool spindle.

22. A spindle head for a boring machine comprising a frame, a drive shaft rotatably supported by said frame, a tool spindle rotatably supported by said frame, a gear drive adapted to operatively connect said tool spindle with said shaft, and a second drive adapted to operatively connect said tool spindle with said shaft, said second drive including a flexible cnnection encircling said tool spindle.

23. A spindle head for a boring machine comprising a frame adapted to be slidably supported on a column, a drive shaft supported by said frame, a tool spindle supported by said frame, an intermediate shaft supported by said frame, change gears supported on said shafts and said tool spindle adapted to drive said tool spindle from said drive shaft, a flexible drive adapted to operatively connect one of said shafts to said tool spindle, and means for rendering either of said drives effective for rotoating said spindle.

24. In a machine tool, the combination of a frame, a drive shaft, a spindle quill rotatably supported by said frame, a spindle slidably keyed in said spindle quill, a plurality of means adapted to operatively connect said shaft and said quill, one of said means including a flexible drive connection, and means for preventing simultaneous operation of said means.

25. In a machine tool the combination of a frame, a drive shaft, a spindle quill rotatably supported by said frame, a spindle slidably keyed in said spindle quill, a plurality of means adapted to drive said spindle quill from said shaft, one of said means including a flexible drive connection, means for connecting and disconnecting either of said means for driving said spindle quill, and means for preventing the simultaneous operation of a plurailty of said means for driving said spindle quill.

26. In a spindle head for a boring machine the combination of a frame, a drive shaft rotatably supported in said frame, a spindle quill rotatably supported in said frame, a spindle slidably keyed to said spindle quill, a gear train adapted to operatively connect said shaft and said spindle quill, a flexible drive adapted to operatively connect said shaft and said spindle quill, and means for connecting and disconnecting said flexible drive.

27. In a machine tool of the character described the combination of a frame, a spindle quill rotatably supported by said frame, a spindle slidably supported by said spindle quill, means for preventing relative rotation between said spindle and said spindle quill, and a plurality of means for rotating said spindle quill, one of said means including a flexible drive connection.

28. In a machine tool of the character described the combination of a frame, a spindle quill rotatably supported by said frame, a spindle slidably supported by said spindle quill, means for preventing relative rotation between said spindle and said spindle quill, a gear drive adapted to rotate said spindle quill, a flexible drive adapted to rotate said spindle quill, and means for operatively connecting and disconnecting either of said drives.

HENRY M. LUCAS.
HALLIS N. STEPHAN.

CERTIFICATE OF CORRECTION.

Patent No. 1,947,862.          February 20, 1934.

HENRY M. LUCAS, ET AL.

It is hereby certified that error appears in the printed specification of the above numbered patent requiring correction as follows: Page 4, line 100, claim 2, strike out the word "encircling" and insert the word for, and line 101, strike out "for" first occurrence, and insert encircling; page 5, lines 64, and 65, claim 18, strike out "encircling said tool spindle for rotating" and insert adapted to rotate, and line 66, strike out "adapted to rotate" and insert encircling said tool spindle for rotating; and that the said Letters Patent should be read with these corrections therein that the same may conform to the record of the case in the Patent Office.

Signed and sealed this 24th day of April, A. D. 1934.

Bryan M. Battey (Seal)          Acting Commissioner of Patents.

said means including a flexible drive connection.

28. In a machine tool of the character described the combination of a frame, a spindle quill rotatably supported by said frame, a spindle slidably supported by said spindle quill, means for preventing relative rotation between said spindle and said spindle quill, a gear drive adapted to rotate said spindle quill, a flexible drive adapted to rotate said spindle quill, and means for operatively connecting and disconnecting either of said drives.

HENRY M. LUCAS.
HALLIS N. STEPHAN.

CERTIFICATE OF CORRECTION.

Patent No. 1,947,862.        February 20, 1934.

HENRY M. LUCAS, ET AL.

It is hereby certified that error appears in the printed specification of the above numbered patent requiring correction as follows: Page 4, line 100, claim 2, strike out the word "encircling" and insert the word for, and line 101, strike out "for" first occurrence, and insert encircling; page 5, lines 64, and 65, claim 18, strike out "encircling said tool spindle for rotating" and insert adapted to rotate, and line 66, strike out "adapted to rotate" and insert encircling said tool spindle for rotating; and that the said Letters Patent should be read with these corrections therein that the same may conform to the record of the case in the Patent Office.

Signed and sealed this 24th day of April, A. D. 1934.

Bryan M. Battey (Seal)        Acting Commissioner of Patents.